United States Patent
Chang

(10) Patent No.: US 9,607,764 B2
(45) Date of Patent: *Mar. 28, 2017

(54) METHOD OF FABRICATING HIGH ENERGY DENSITY AND LOW LEAKAGE ELECTRONIC DEVICES

(71) Applicant: Chun-Yen Chang, HsinChu County (TW)

(72) Inventor: Chun-Yen Chang, HsinChu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,463

(22) Filed: Sep. 4, 2015

(65) Prior Publication Data

US 2015/0380162 A1    Dec. 31, 2015

Related U.S. Application Data

(63) Continuation-in-part of application No. 12/908,066, filed on Oct. 20, 2010, now Pat. No. 9,142,354.

(51) Int. Cl.
*B05D 5/12* (2006.01)
*H01G 4/00* (2006.01)
(Continued)

(52) U.S. Cl.
CPC .............. *H01G 4/06* (2013.01); *H01G 4/002* (2013.01); *H01G 4/255* (2013.01); *H01G 4/30* (2013.01)

(58) Field of Classification Search
USPC ..................................................... 427/79–81
See application file for complete search history.

(56) References Cited

U.S. PATENT DOCUMENTS 3,353,056 A   11/1967   Hershyn
6,021,039 A    2/2000   Inagawa
(Continued)

FOREIGN PATENT DOCUMENTS

CN   101777433 A       7/2010
GB      2445811   *    7/2008
(Continued)

OTHER PUBLICATIONS

S.K. Saha*, et al, "A nanocapacitor with giant dielectric permittivity", Nano technology, 17, 2284, 2006.
(Continued)

*Primary Examiner* — Brian K Talbot
(74) *Attorney, Agent, or Firm* — John R. Kasha; Kelly L. Kasha; Kasha Law LLC

(57) ABSTRACT

A method for fabricating a magnetic capacitor is provided. A first conducting material is deposited to form a first electrode layer. One or more first ferro-magnetic elements are deposited to form magnetic layer and are aligned and magnetized to produce a magnetic field. An insulating material is deposited to form an insulating layer. A second conducting material is deposited to form a second electrode layer. The one or more ferro-magnetic elements are aligned and magnetized to apply the magnetic field to the insulator layer so that the magnetic field is perpendicular to the first electrode layer and the second electrode layer, and so that the magnetic field is periodic along the length of the insulator layer and results in electric dipoles being formed in the insulator layer when a voltage is applied between the first electrode layer and the second electrode layer.

20 Claims, 16 Drawing Sheets

(51) Int. Cl.
*H01G 4/06* (2006.01)
*H01G 4/30* (2006.01)
*H01G 4/002* (2006.01)
*H01G 4/255* (2006.01)

(56) References Cited

U.S. PATENT DOCUMENTS

| | | | |
|---|---|---|---|
| 6,341,058 B1 | 1/2002 | Sakata et al. | |
| 6,359,769 B1 | 3/2002 | Mushiake et al. | |
| 6,475,670 B1 | 11/2002 | Ito | |
| 7,289,312 B2 | 10/2007 | Duff | |
| 7,486,497 B2 | 2/2009 | Kobayashi et al. | |
| 7,489,495 B2 | 2/2009 | Stevenson | |
| 7,821,771 B2* | 10/2010 | Lai | H01G 7/00 361/502 |
| 2002/0027262 A1 | 3/2002 | Park et al. | |
| 2004/0175561 A1 | 9/2004 | Duff | |
| 2006/0044644 A1 | 3/2006 | Wu et al. | |
| 2009/0141423 A1 | 6/2009 | Lai | |
| 2009/0257150 A1 | 10/2009 | Lai | |
| 2009/0257168 A1* | 10/2009 | Lai | B82Y 25/00 361/301.1 |
| 2010/0142116 A1* | 6/2010 | Kim | H01G 4/255 361/272 |
| 2010/0194331 A1* | 8/2010 | Lai | H01G 4/008 320/101 |
| 2010/0202099 A1* | 8/2010 | Yeh | H01G 4/008 361/305 |
| 2010/0214718 A1* | 8/2010 | Yeh | H01L 28/60 361/305 |
| 2010/0277392 A1 | 11/2010 | Hsu et al. | |
| 2010/0302703 A1* | 12/2010 | Hwang | H01G 4/008 361/305 |
| 2011/0013339 A1 | 1/2011 | Lai et al. | |
| 2011/0051313 A1* | 3/2011 | Hwang | H01G 4/20 361/311 |
| 2011/0136317 A1* | 6/2011 | Kang | H01L 21/02183 438/396 |
| 2011/0183180 A1* | 7/2011 | Yu | H01G 11/36 429/128 |
| 2011/0205688 A1 | 8/2011 | Ray et al. | |
| 2012/0044611 A1* | 2/2012 | Edelstein | H01G 7/026 361/278 |
| 2015/0179345 A1* | 6/2015 | Hong | H01G 4/008 361/281 |
| 2015/0371777 A1* | 12/2015 | Hsieh | H01G 4/10 361/305 |

FOREIGN PATENT DOCUMENTS

| | | | |
|---|---|---|---|
| GB | 2445812 | * | 7/2008 |
| JP | 2010199579 A | | 9/2010 |
| TW | 201025375 | | 7/2010 |

OTHER PUBLICATIONS

S.K. Saha*, "Observation of giant dielectric constant in an assembly of ultrafine Ag particles", Phys. Rev. B, 69, 125416, 2004.

L. Menna, et al, "Giant magnetic suppression of tunneling out of a 2D electron system", PRL, V70, N14, 1993.

W.R. Chen, et al, Appl. Phys. Letts, V91, Issue8, N.082103, Aug. 2007.

C.K. Yin, et al, Jpn. J. of Appl. Phys, V89,083109, 2006.

* cited by examiner

METHOD OF FABRICATING HIGH ENERGY DENSITY AND LOW LEAKAGE ELECTRONIC DEVICES

CROSS-REFERENCE TO RELATED APPLICATION

This application is a continuation-in-part of U.S. patent application Ser. No. 12/908,066, filed Oct. 20, 2010, the content of which is incorporated by reference herein in its entirety.

INTRODUCTION

In order to produce a capacitor or electronic device with a Giant or very high capacitance, an insulator with a very high dielectric constant must be fabricated. In one exemplary device, a very high dielectric constant of $\in=10^7$ was produced by embedding metal atoms (e.g., gold) in an insulator. The insulator was placed between two nanometer (nm) wide and micrometer (μm) long metal plates as electrodes. In another similar exemplary device, a very high dielectric constant of $\in=10^{10}$ was produced by embedding metal strings in a porous insulator placed between two electrodes. Although these devices are capable of producing a high dielectric constant, it has not been shown for either device that the energy storage density can be increased as the dielectric thickness is reduced below 50 μm. Further, neither of these devices has yet produced a very high capacitance.

BRIEF DESCRIPTION OF THE DRAWINGS

The skilled artisan will understand that the drawings, described below, are for illustration purposes only. The drawings are not intended to limit the scope of the present teachings in any way.

Figure 1:
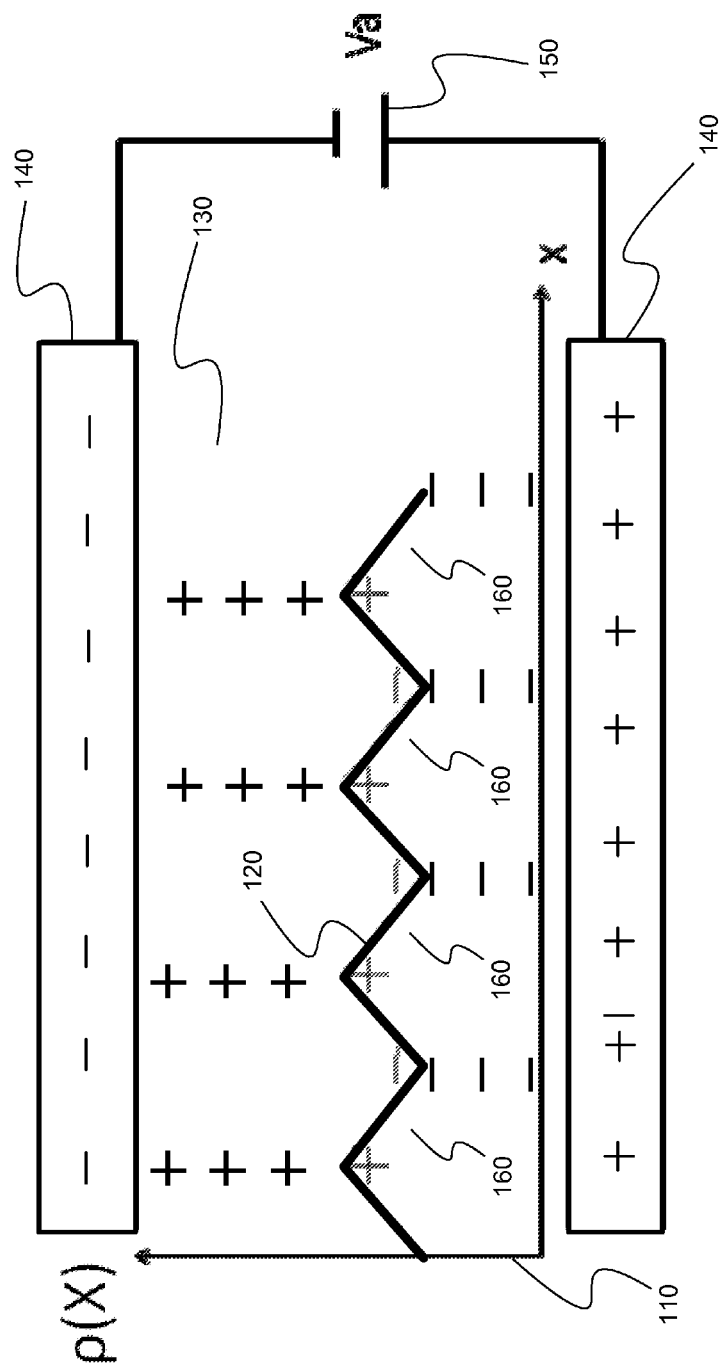
FIG. 1 is a schematic diagram showing a plot of the effective charge profile superimposed on the insulator portion of a capacitor produced by a periodic magnetic field applied perpendicular to the electrodes of the capacitor, in accordance with various embodiments.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

As described above, conventional capacitors with a very high dielectric constant, $\in$, between $10^7$ and $10^{10}$, have been produced by embedding metal atoms or metal strings in an insulator placed between two electrodes. The dielectric thickness, d, of these conventional capacitors is reported to be about 50 micrometers (μm) or larger.

In order to determine how scalable these conventional capacitors are, a relationship between the static dielectric constant, $\in_s$, and d, is developed for a constant energy storage density. The energy stored in a flat-plate capacitor is given by $$W_{stored} = \frac{1}{2}CV^2,$$

where C is the capacitance and V is the voltage. The stored energy density is found by dividing $W_{stored}$ by the volume Ad, where A is the area of an electrode.

$$\frac{W_{stored}}{Ad} = \frac{1}{2}\frac{CV^2}{Ad}$$

The dielectric or insulator thickness, d, is related to the capacitance, C, by the formula $$C = \varepsilon_0 \varepsilon_s \frac{A}{d}.$$

Substituting this formula for the capacitance into the equation for the stored energy density produces $$\frac{W_{stored}}{Ad} = \frac{1}{2}\frac{\varepsilon_0 \varepsilon_s V^2}{d^2},$$

where $\in_0$ is the electric constant.

If the stored energy density and the voltage remain constant, $\in_s$ is proportional to $d^2$. In other words, as the dielectric thickness decreases, the energy storage density remains constant.

Therefore, if the dielectric thickness of a conventional capacitor is decreased below 50 μm, the dielectric constant of the capacitor will decrease proportionally even more. In other words, conventional capacitors with very high dielectric constants are not scalable to smaller dielectric thicknesses.

A Magnetic Capacitor

In various embodiments, a magnetic field is added to a capacitive device to produce a device with both a high dielectric constant and a very high capacitance. In particular, a magnetic field is applied to an electronic device to increase the dielectric constant of the device to greater than $10^{10}$ while maintaining its dielectric or insulator thickness below 100 nm. Such electronic devices or magnetic capacitors that include a magnetic field can produce a Giant or very high capacitance that, in turn, can store a very large amount of electrical energy.

Perpendicular Magnetization

In various embodiments, an insulator is magnetized between two electrodes in the direction perpendicular to the electrodes to produce a very high capacitance and to store a very large amount of electrical energy. The insulator is magnetized according to the following periodic magnetic field formula, for example.

$$\vec{B} = B_1\left(1 + \cos\left(\frac{2\pi}{\lambda}x\right)\right)\hat{z}$$

The effective potential profile is given by the following equation.

$$V_{Beff} \frac{e^2}{2m}\left(-B_1\left(\frac{\lambda}{2\pi}\sin\left(\frac{2\pi}{\lambda}x\right)\right) + \frac{\hbar k_y}{e}\right)^2$$

According to Poisson's formula, the effective charge profile is then provided by the following equation.

$$\rho_{Beff} = \varepsilon \nabla^2 V_{Beff} = \varepsilon \frac{e^2}{m}\left(B_1\left(B_1\left(2\cos\left(\frac{2\pi}{\lambda}x\right) - 1\right) - \frac{\hbar k_y}{e}\frac{2\pi}{\lambda}\sin^2\left(\frac{2\pi}{\lambda}x\right)\right)\right)$$

FIG. 1 is a schematic diagram showing a plot 110 of the effective charge profile 120 superimposed on the insulator portion 130 of a capacitor 100, in accordance with various embodiments. Effective charge profile 120 produced by a periodic magnetic field applied perpendicular to the electrodes 140 of capacitor 100. The magnetic field (not shown) is periodic in the x-direction, which, in turn, produces periodic effective charge profile 120 in plot 110. Under applied voltage 150, electric dipoles 160 are formed in insulator portion 130 of capacitor 100.

In various embodiments, a magnetic capacitor is fabricated as an electronic device and includes a first electrode layer, a second electrode layer, an insulator layer, a first magnetized layer and a second magnetized layer. The insulator layer is located between the first electrode layer and the second electrode layer and between the first magnetized layer and the second magnetized layer. The first magnetized layer includes a first ferro-magnetic material and the second magnetized layer includes a second ferro-magnetic material. The first magnetized layer and the second magnetized layer are located so that the first ferro-magnetic material and the second ferro-magnetic material apply a magnetic field to the insulator layer to improve an electrical property of the magnetic capacitor.

In various embodiments, a magnetic capacitor can also be fabricated with just one magnetized layer. For example, the first magnetized layer is located so that the first ferro-magnetic material applies a magnetic field to the insulator layer to improve an electrical property of the magnetic capacitor.

The first ferro-magnetic material and the second ferro-magnetic material can each include one or more ferro-magnetic elements. Ferro magnetic elements can include, but are not limited to, ferro-magnetic plates or magnetic nanodots. The first magnetized layer and the second magnetized layer can be located between the first electrode layer and the second electrode layer.

In order to provide a periodic magnetic field along the length of the insulator layer, the first ferro-magnetic material of the first magnetized layer and the second ferro-magnetic material of the second magnetized layer are magnetized so that the first ferro-magnetic material and the second ferro-magnetic material apply a magnetic field substantially perpendicular to the first electrode layer and the second electrode layer. Each element of the first ferro-magnetic material and each element of the second ferro-magnetic material are also magnetized in the same direction.

Figure 2:
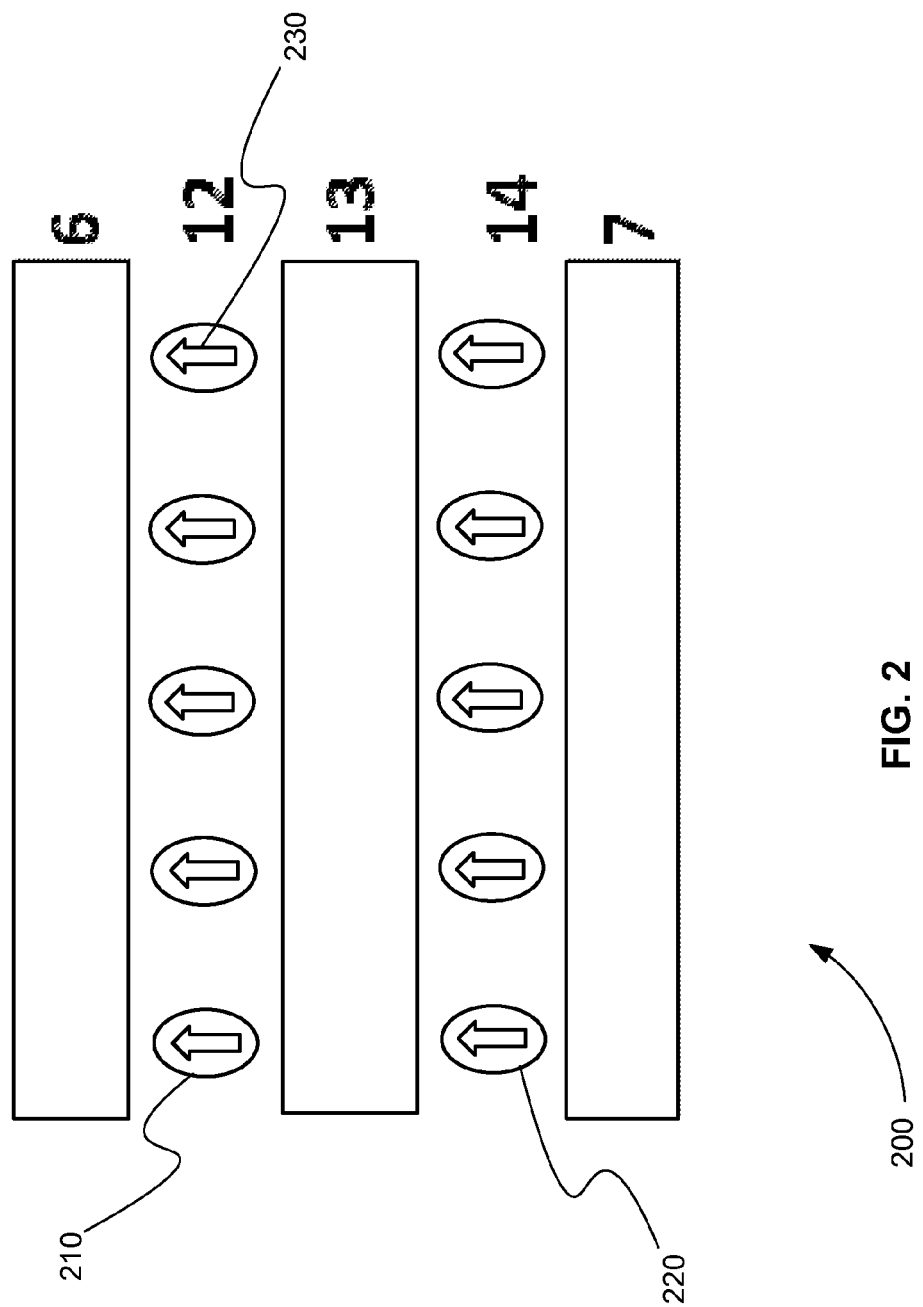
FIG. 2 is a schematic diagram showing an electronic device that includes two magnetized layers between two electrode layers that apply a magnetic field to an insulator layer that is perpendicular to the electrode layers, in accordance with various embodiments.

FIG. 2 is a schematic diagram showing a magnetic capacitor 200, in accordance with various embodiments. Magnetic capacitor 200 includes a first magnetized layer 12 and a second magnetized layer 14 located between first electrode layer 6 and second electrode layer 7. First magnetized layer 12 and second magnetized layer 14 apply a magnetic field to insulator layer 13 that is perpendicular to first electrode layer 6 and second electrode layer 7.

First magnetized layer 12 and second magnetized layer 14 are located on either side of insulator layer 13. First magnetized layer 12 includes first ferro-magnetic elements 210, and second magnetized layer 14 includes second ferro-magnetic elements 220. First ferro-magnetic elements 210 and second ferro-magnetic elements 220 can include the same ferro-magnetic elements or can include different ferro-magnetic elements. First ferro-magnetic elements 210 and second ferro-magnetic elements 220 are substantially aligned in the direction perpendicular to first electrode layer 6 and second electrode layer 7. In various embodiments, first ferro-magnetic elements 210 and second ferro-magnetic elements 220 are not substantially aligned in the direction perpendicular to first electrode layer 6 and second electrode layer 7, for example.

First ferro-magnetic elements 210 and second ferro-magnetic elements 220 are magnetized in the same direction to produce a periodic magnetic field along the length of insulator 13 that is perpendicular to first electrode layer 6 and second electrode layer 7. Arrows 230 show the direction of magnetization of first ferro-magnetic elements 210 and second ferro-magnetic elements 220. Also, all first ferro-magnetic elements 210 in first magnetized layer 12 are magnetized in the same direction. Likewise, all second ferro-magnetic elements 220 in second magnetized layer 14 are magnetized in the same direction.

In various embodiments, ferro-magnetic elements within each magnetized layer of a magnetic capacitor are alternately magnetized in opposite directions to produce a magnetized layer that applies a periodic magnetic field along the length of an insulator layer. Each ferro-magnetic element or each group of ferro-magnetic elements may be alternately magnetized in opposite directions, for example.

Figure 3:
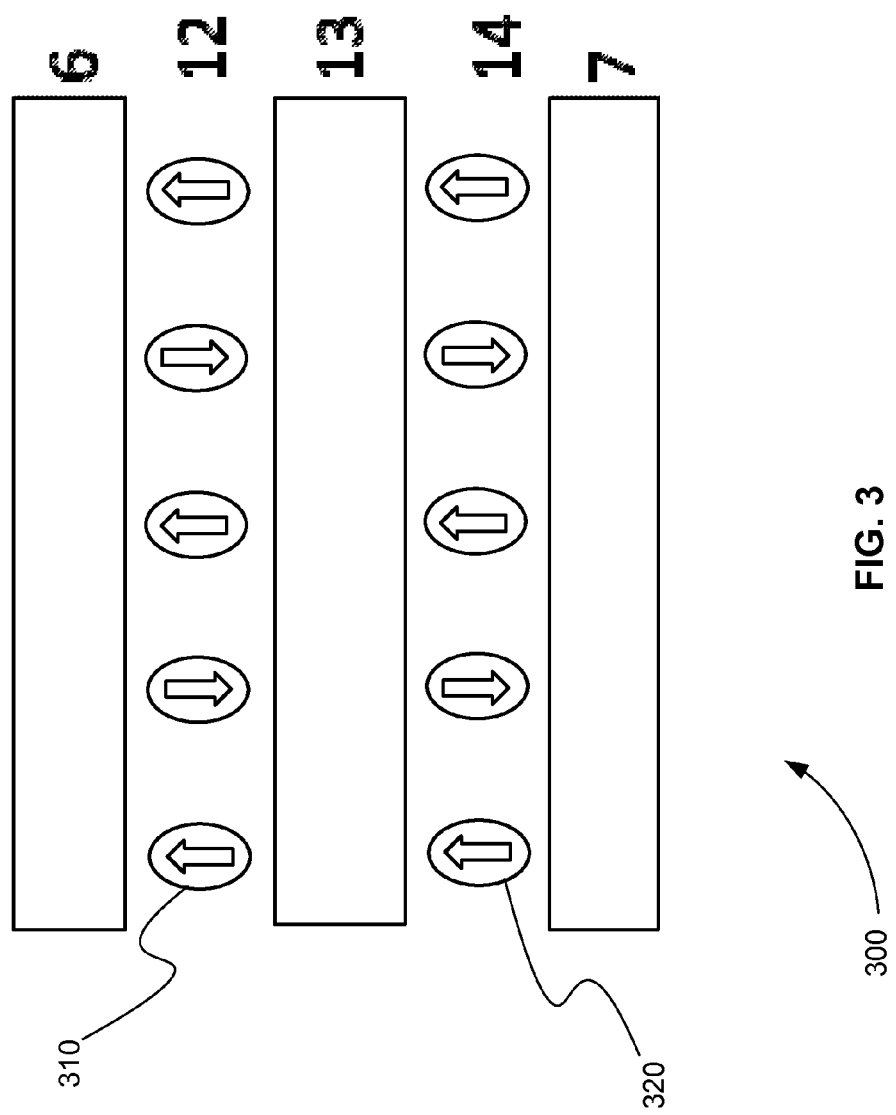
FIG. 3 is a schematic diagram showing a magnetic capacitor that includes two magnetized layers that include ferro-magnetic elements within the layers that are alternately magnetized in opposite directions and apply a magnetic field to an insulator layer that is perpendicular to two electrode layers, in accordance with various embodiments.

FIG. 3 is a schematic diagram showing a magnetic capacitor 300, in accordance with various embodiments. Magnetic capacitor 300 includes a first magnetized layer 12 with first ferro-magnetic elements 310 and a second magnetized layer 14 with second ferro-magnetic elements 320. Each ferro-magnetic element of ferro-magnetic elements 310 and each ferro-magnetic element of ferro-magnetic elements 320 is alternately magnetized. As a result, adjacent ferro-magnetic elements in each magnetized layer are magnetized in opposite directions.

In various embodiments, a first magnetized layer and a second magnetized layer of a magnetic capacitor are located on either side of an insulator layer, but outside of a first electrode layer and a second electrode layer.

Figure 4:
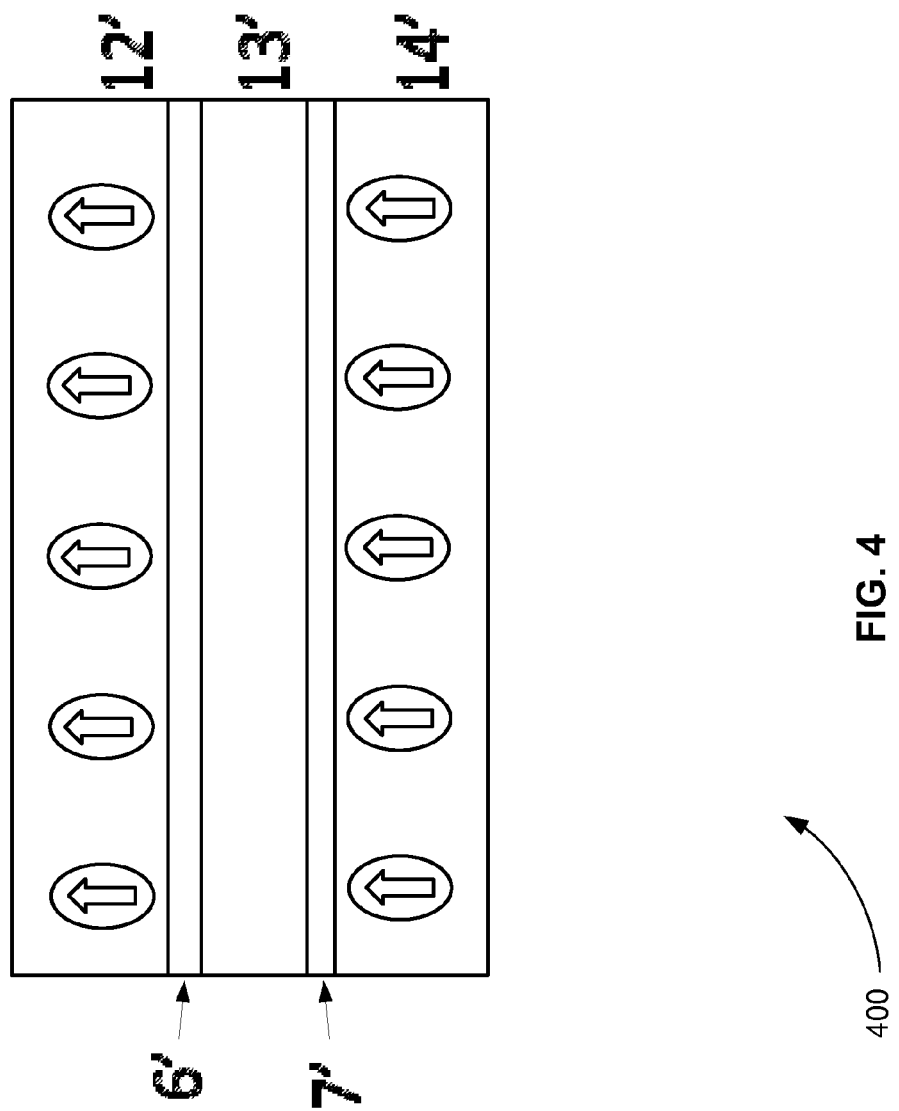
FIG. 4 is a schematic diagram showing an electronic device that includes two magnetized layers outside of two electrode layers that apply a magnetic field to an insulator layer that is perpendicular to two electrode layers, in accordance with various embodiments.

FIG. 4 is a schematic diagram showing a magnetic capacitor 400, in accordance with various embodiments. Magnetic capacitor 400 includes a first magnetized layer 12' and a second magnetized layer 14' located outside of first electrode layer 6' and second electrode layer 7'. First magnetized layer 12' and second magnetized layer 14' apply a magnetic field to insulator layer 13' that is perpendicular to first electrode layer 6' and second electrode layer 7'. First electrode layer 6' and second electrode layer 7' are located on either side of insulator layer 13'.

In various embodiments, both a first magnetized layer and a second magnetized layer of a magnetic capacitor can include one or more additional magnetized layers to enhance the magnetic field applied to the insulator layer. The one or more additional magnetized layers can be adjacent to or separate from the first magnetized layer or the second magnetized layer. The first magnetized layer, the second magnetized layer, and each of the one or more additional magnetized layers can include the same or different insulating, ferro-magnetic materials, or ferro-magnetic elements.

In various embodiments, a magnetic capacitor can also include one or more additional insulating layers. An insulating layer and the one or more additional insulating layers can be layered between a first magnetized layer and one or more additional magnetized layers forming a super-lattice, for example.

In various embodiments, a periodic magnetic field is applied to the length of an insulator layer of a magnetic capacitor using a first magnetized layer and a second magnetized layer that each applies a magnetic field parallel to the electrode layers. The first ferro-magnetic elements of the first magnetized layer and the second ferro-magnetic elements of the second magnetized layer are magnetized in opposite directions. The parallel components of the magnetic field are, therefore, cancelled out and the resultant magnetic field applied to the insulator layer is substantially perpendicular to the electrode layers.

Figure 5:
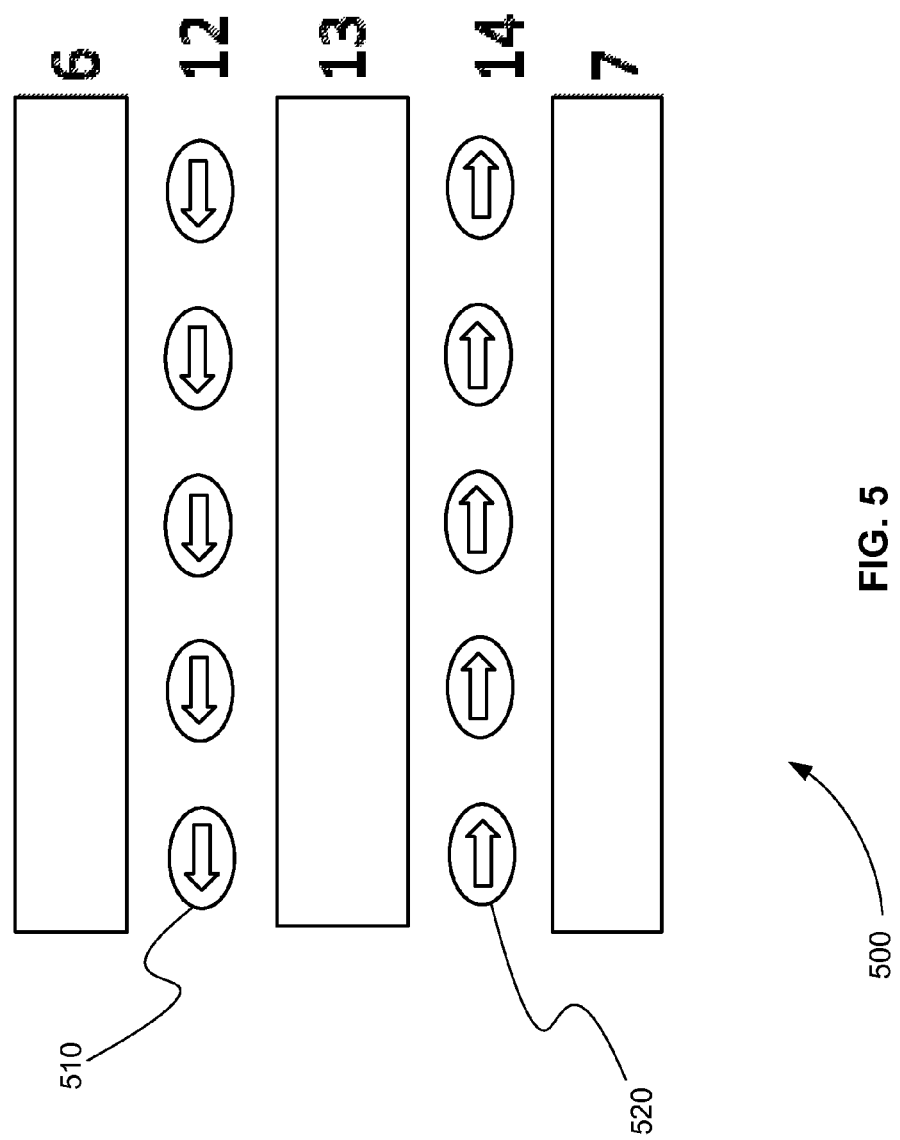
FIG. 5 is a schematic diagram showing an electronic device that includes two magnetized layers with ferro-magnetic elements magnetized parallel to the electrode layers but in opposite directions that apply a magnetic field to an insulator layer that is perpendicular to two electrode layers, in accordance with various embodiments.

FIG. 5 is a schematic diagram showing a magnetic capacitor 500, in accordance with various embodiments. Magnetic capacitor 500 includes a first magnetized layer 12 with first ferro-magnetic elements 510 and a second magnetized layer 14 with second ferro-magnetic elements 520. First ferro-magnetic elements 510 and second ferro-magnetic elements 520 are magnetized in a direction parallel to first electrode layer 6 and second electrode layer 7. However, first ferro-magnetic elements 510 and second ferro-magnetic elements 520 are magnetized in opposite directions. As a result, the parallel components of the magnetic fields of first magnetized layer 12 and second magnetized layer 14 in insulator layer 13 substantially cancel each other out. The magnetic field that remains in insulator layer 13 is then perpendicular to first electrode layer 6 and second electrode layer 7 and periodic along the length of insulator layer 13.

Parallel Magnetization

In various embodiments, magnetizing an insulator layer between two electrode layers in the direction parallel to the electrode layers of a magnetic capacitor can also reduce the dielectric leakage current and increase the dielectric breakdown voltage. This, in turn, makes the insulator layer more insulating. As a result, the dielectric leakage current and dielectric breakdown voltage of the magnetic capacitor described above can be improved by magnetizing the insulator layer in a direction parallel to the electrodes.

In various embodiments, the ferro-magnetic elements of two magnetized layers of a magnetic capacitor are magnetized so that the ferro-magnetic elements apply a magnetic field to an insulator layer that is substantially parallel to the electrode layers. In order to apply a magnetic field to the insulator layer that is substantially parallel to the electrode layers, the ferro-magnetic elements of each of the two magnetized layers are magnetized in the same direction.

The improvement in leakage current or breakdown voltage is dependent on the concentration of the magnetic field applied to the insulating layer. The magnetic field applied to the insulating layer is produced by the two magnetized layers on either side of the insulating layer. Since magnetic field applied by the two magnetized layers is in the parallel direction, it is not directly aimed at the insulating layer and is largely concentrated in the magnetized layers. Consequently, the concentration of the magnetic field in the insulating is reduced and can be non-uniform across the length of the insulating layer.

In various embodiments, the magnetized layers of a magnetic capacitor include an inner layer and an adjacent outer layer that concentrate the magnetic field in the insulator layer. The inner layer is shorter in length than the outer layer. The inner layer is closer to the insulator layer than the outer layer. The shorter length of the inner layer relative to the outer layer concentrates the magnetic field in the insulator layer.

In various embodiments, a magnetic capacitor can also include a single magnetized layer that includes ferro-magnetic elements that apply a magnetic field to the insulator layer. The magnetic field is substantially parallel to the first electrode layer and the second electrode layer. The single magnetized layer can also include an inner and outer layer as described above.

Figure 6:
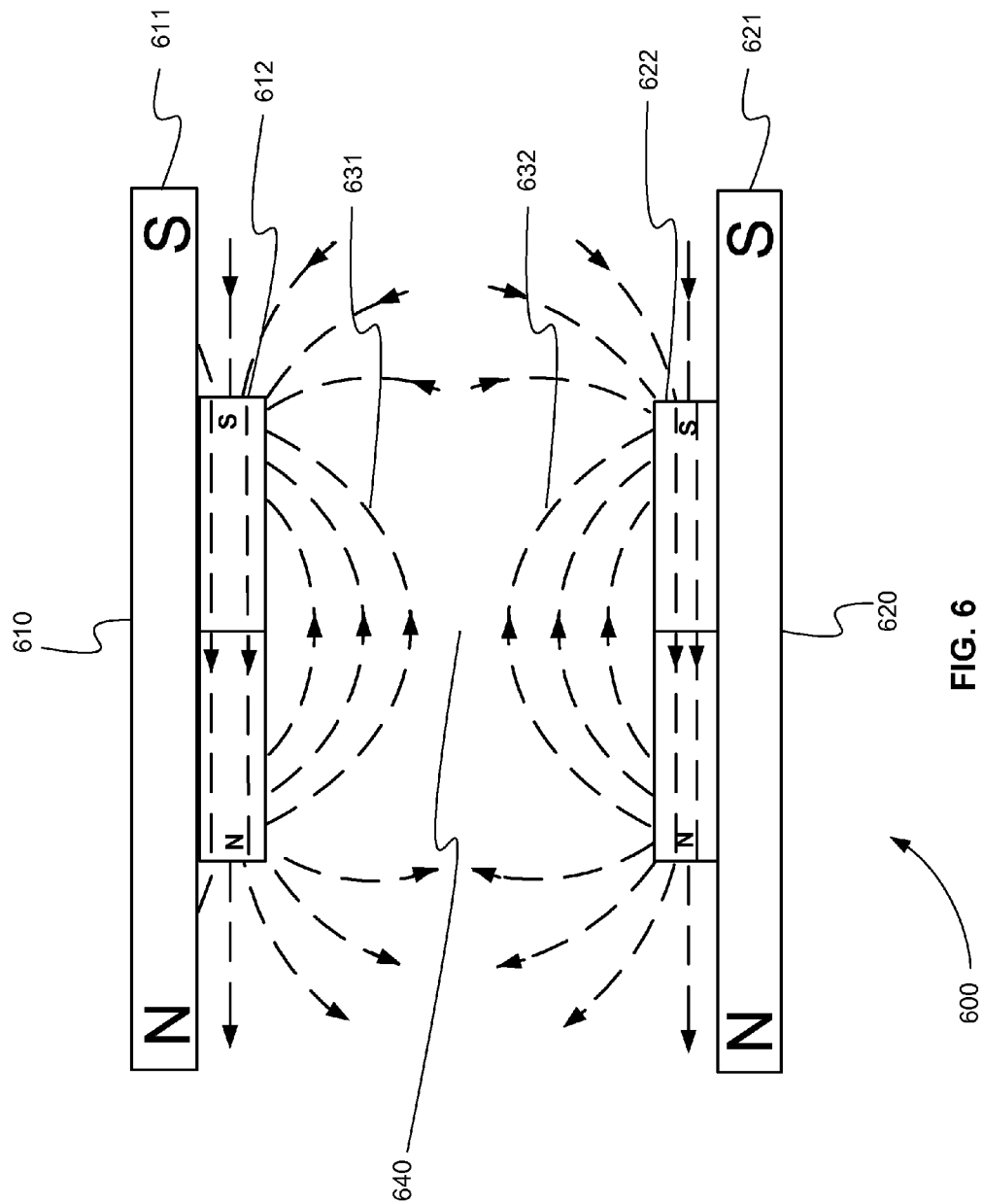
FIG. 6 is a schematic diagram showing a portion of a magnetic capacitor that includes a first magnetized layer and a second magnetized layer each of which includes an outer layer and an inner layer, in accordance with various embodiments.

FIG. 6 is a schematic diagram showing a portion of a magnetic capacitor 600 that includes a first magnetized layer 610 and a second magnetized layer 620 each of which includes an outer layer and an inner layer, in accordance with various embodiments. First magnetized layer 610 includes outer layer 611 and inner layer 612. Second magnetized layer 620 includes outer layer 621 and inner layer 622. Inner layer 612 is shorter in length than outer layer 611, and inner layer 622 is shorter in length than outer layer 621.

First magnetized layer 610 applies magnetic field 631 to insulating layer 640. Second magnetized layer 620 applies magnetic field 632 to insulating layer 640. Inner layer 612 of first magnetized layer 610 concentrates magnetic field 631 in insulating layer 640. Inner layer 622 of first magnetized layer 620 concentrates magnetic field 632 in insulating layer 640.

In various embodiments, a magnetic capacitor can include a first magnetized layer and a second magnetized layer that each can include an inner layer and an outer layer. The first magnetized layer and the second magnetized layer can be located on either side of the insulator layer and between the first electrode layer and the second electrode layer.

Figure 7:
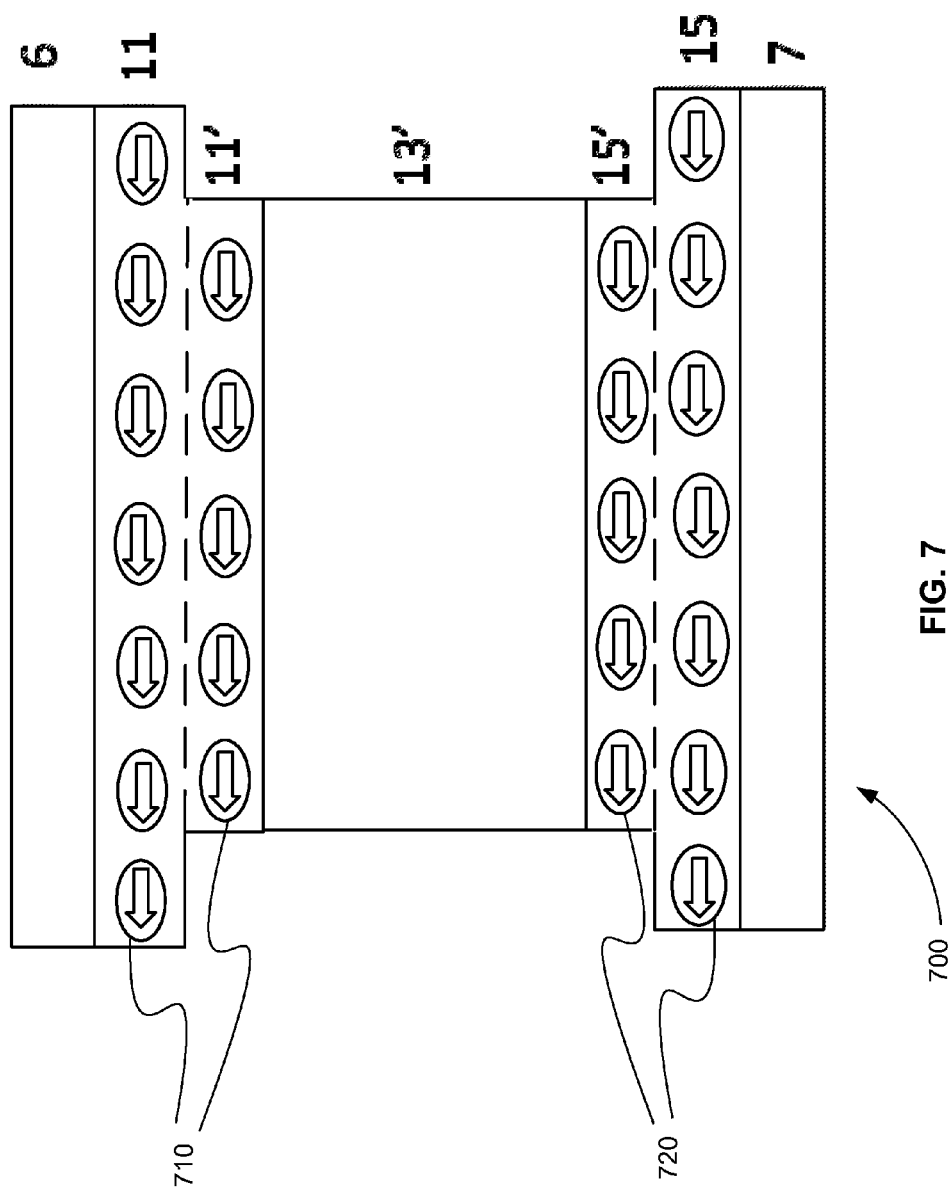
FIG. 7 is a schematic diagram showing a magnetic capacitor that includes a first magnetized layer with an outer layer and an inner layer and a second magnetized layer with an outer layer and an inner layer located between a first electrode layer and a second electrode layer that apply a magnetic field to an insulator layer that is parallel to the first electrode layer and the second electrode layer, in accordance with various embodiments.

FIG. 7 is a schematic diagram showing a magnetic capacitor 700, in accordance with various embodiments. Magnetic capacitor 700 includes a first magnetized layer with outer layer 11 and inner layer 11' and a second magnetized layer with outer layer 15 and inner layer 15' located between first electrode layer 6 and second electrode layer 7. Outer layer 11, inner layer 11', outer layer 15, and inner layer 15' apply a magnetic field to insulator layer 13' that is parallel to first electrode layer 6 and second electrode layer 7.

The first magnetized layer and the second magnetized layer are located on either side of insulator layer 13'. The first magnetized layer includes first ferro-magnetic elements 710, and the second magnetized layer includes second ferro-magnetic elements 720. First ferro-magnetic elements 710 and second ferro-magnetic elements 720 can include the same ferro-magnetic material or can include different ferro-magnetic materials. First ferro-magnetic elements 710 and second ferro-magnetic elements 720 are, however, magnetized in the same direction.

In various embodiments, a magnetic capacitor can include a first magnetized layer and a second magnetized layer that are located on either side of a insulator layer, but outside of a first electrode layer and a second electrode layer. In addition, the first magnetized layer and the second magnetized layer can each include an inner layer and an outer layer.

Figure 8:
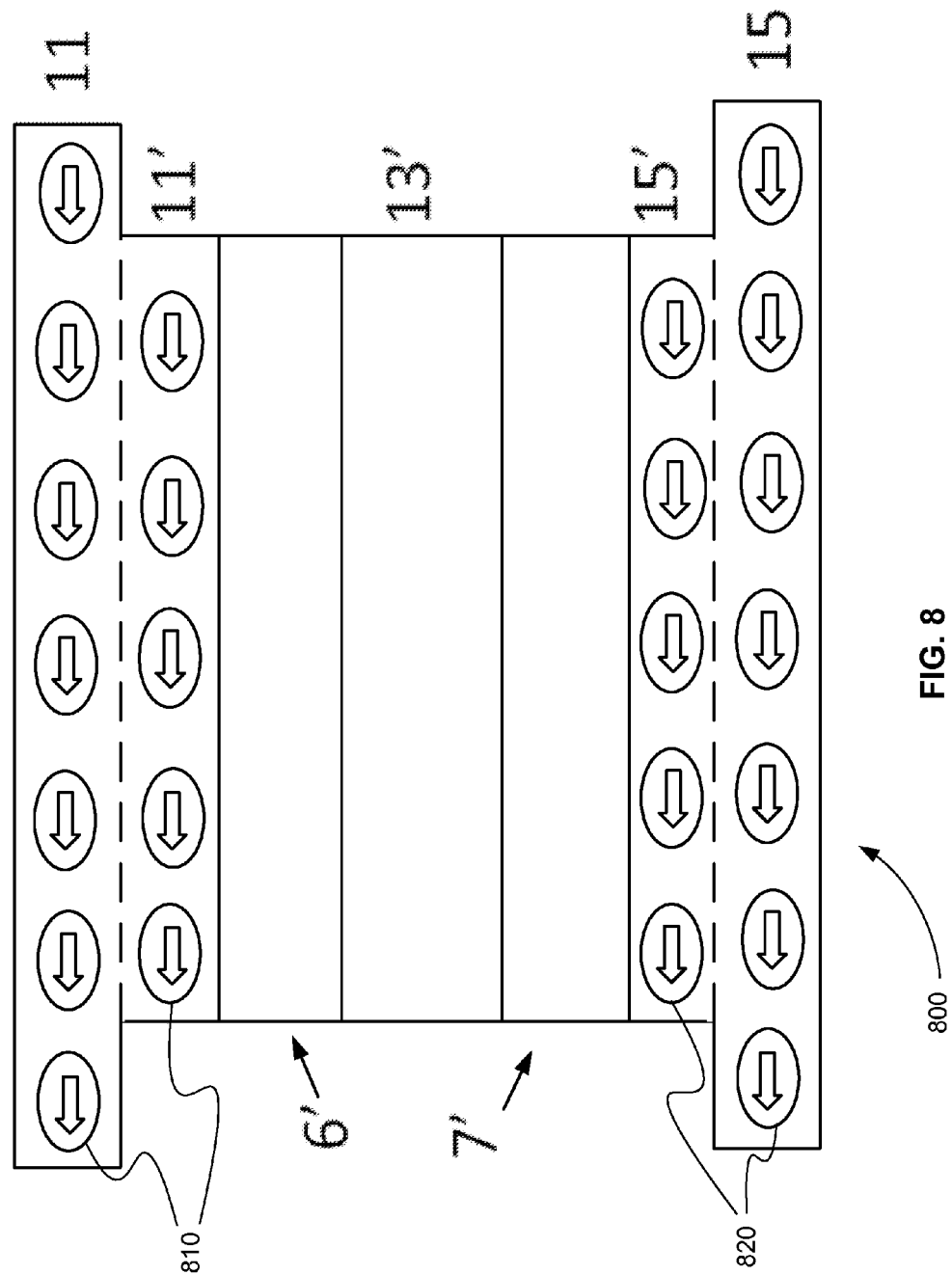
FIG. 8 is a schematic diagram showing a magnetic capacitor that includes a first magnetized layer with an outer layer and an inner layer and a second magnetized layer with an outer layer and an inner layer located outside of a first electrode layer and a second electrode layer that apply a magnetic field to an insulator layer that is parallel to the first electrode layer and the second electrode layer, in accordance with various embodiments.

FIG. 8 is a schematic diagram showing a magnetic capacitor 800, in accordance with various embodiments. Magnetic capacitor 800 includes a first magnetized layer with outer layer 11 and inner layer 11' and a second magnetized layer with outer layer 15 and inner layer 15' located outside of first electrode layer 6' and second electrode layer 7'. Outer layer 11, inner layer 11', outer layer 15, and inner layer 15' apply a magnetic field to insulator layer 13' that is parallel to first electrode layer 6' and second electrode layer 7'.

The first magnetized layer and the second magnetized layer are located on either side of insulator layer 13'. The first magnetized layer includes first ferro-magnetic elements 810, and the second magnetized layer includes second ferro-magnetic elements 820. First ferro-magnetic elements 810 and second ferro-magnetic elements 820 can include the same ferro-magnetic material or can include different ferro-magnetic materials. First ferro-magnetic elements 810 and second ferro-magnetic elements 820 are, however, magnetized in the same direction.

Perpendicular and Parallel Magnetization

In various embodiments, magnetizing an insulator layer between two electrode layers in directions both substantially perpendicular and parallel to the electrode layers at the same time can increase the capacitance, increase the electrical storage, reduce the dielectric leakage current, and increase the dielectric breakdown voltage of the insulator layer. The magnetic capacitor described above can be modified to provide improvements to all of these electrical properties.

The magnetic capacitor is fabricated to include at least four magnetized layers. The first ferro-magnetic elements of the first magnetized layer and the third ferro-magnetic elements of the third magnetized layer are magnetized in the same direction and in a direction parallel to the first electrode layer and the second electrode layer. The second ferro-magnetic elements of the second magnetized layer and the fourth ferro-magnetic elements of the fourth magnetized layer are magnetized in the same direction and in a direction perpendicular to the first electrode layer and the second electrode layer.

In various embodiments, a magnetic capacitor can also include just two magnetized layers and apply magnetic field to the insulator layer that are both substantially parallel and perpendicular to the electrode layers. The first ferro-magnetic elements of the first magnetized layer are magnetized in a direction parallel to the first electrode layer and the second electrode layer. The second ferro-magnetic elements of the second magnetized layer are magnetized in the direction perpendicular to the first electrode layer and the second electrode layer.

Figure 9:
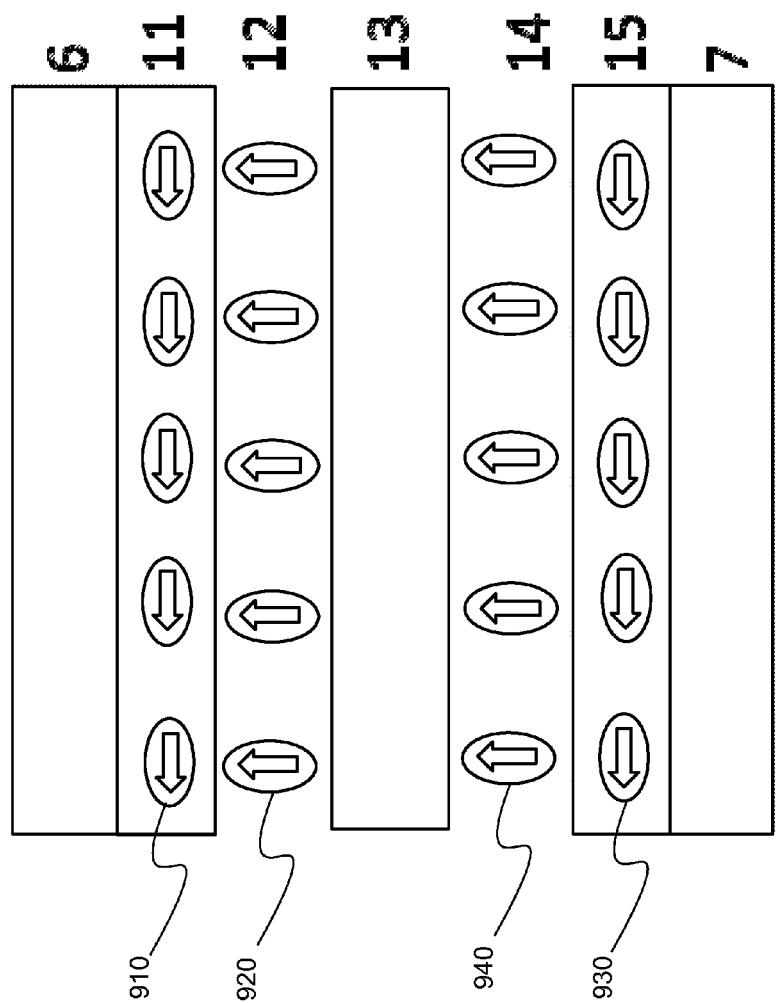
FIG. 9 is a schematic diagram showing a magnetic capacitor that includes a first magnetized layer and a third magnetized layer located between a first electrode layer and a second electrode layer that apply a magnetic field to an insulator layer that is parallel to the first electrode layer and the second electrode layer and that includes a second magnetized layer and a fourth magnetized layer located between the first electrode layer and the second electrode layer that apply a magnetic field to the insulator layer that is perpendicular to the first electrode layer and the second electrode layer, in accordance with various embodiments.

FIG. 9 is a schematic diagram showing a magnetic capacitor 900, in accordance with various embodiments. Magnetic capacitor 900 includes a first magnetized layer 11 and a third magnetized layer 15 located between first electrode layer 6 and second electrode layer 7. First magnetized layer 11 and third magnetized layer 15 apply a magnetic field to insulator layer 13 that is parallel to first electrode layer 6 and second electrode layer 7. Magnetic capacitor 900 also includes a second magnetized layer 12 and a fourth magnetized layer 14 located between first electrode layer 6 and second electrode layer 7. Second magnetized layer 12 and a fourth magnetized layer 14 apply a magnetic field to insulator layer 13 that is perpendicular to first electrode layer 6 and second electrode layer 7.

First magnetized layer 11 and third magnetized layer 15 are located on either side of insulator layer 13. First magnetized layer 11 includes first ferro-magnetic elements 910, and third magnetized layer 15 includes third ferro-magnetic elements 930. First ferro-magnetic elements 910 and third ferro-magnetic elements 930 can include the same ferro-magnetic material or can include different ferro-magnetic materials. First ferro-magnetic elements 910 and third ferro-magnetic elements 930 are, however, magnetized in the same direction.

Second magnetized layer 11 and fourth magnetized layer 15 are located on either side of insulator layer 13. Second magnetized layer 11 includes second ferro-magnetic elements 920, and fourth magnetized layer 15 includes fourth ferro-magnetic elements 940. Second ferro-magnetic elements 920 and fourth ferro-magnetic elements 940 can include the same ferro-magnetic material or can include different ferro-magnetic materials. Second ferro-magnetic elements 920 and fourth ferro-magnetic elements 940 are, however, magnetized in the same direction.

In various embodiments, the first magnetized layer and the third magnetized layer of a magnetic capacitor can each include an inner layer and an adjacent outer layer that concentrate the magnetic field in the insulator layer. The inner layer is shorter in length than the outer layer. The inner layer is closer to the insulator layer than the outer layer. The shorter length of the inner layer relative to the outer layer concentrates the magnetic field in the insulator layer. The first magnetized layer and the third magnetized layer can be located on either side of the insulator layer and between the first electrode layer and the second electrode layer.

Figure 10:
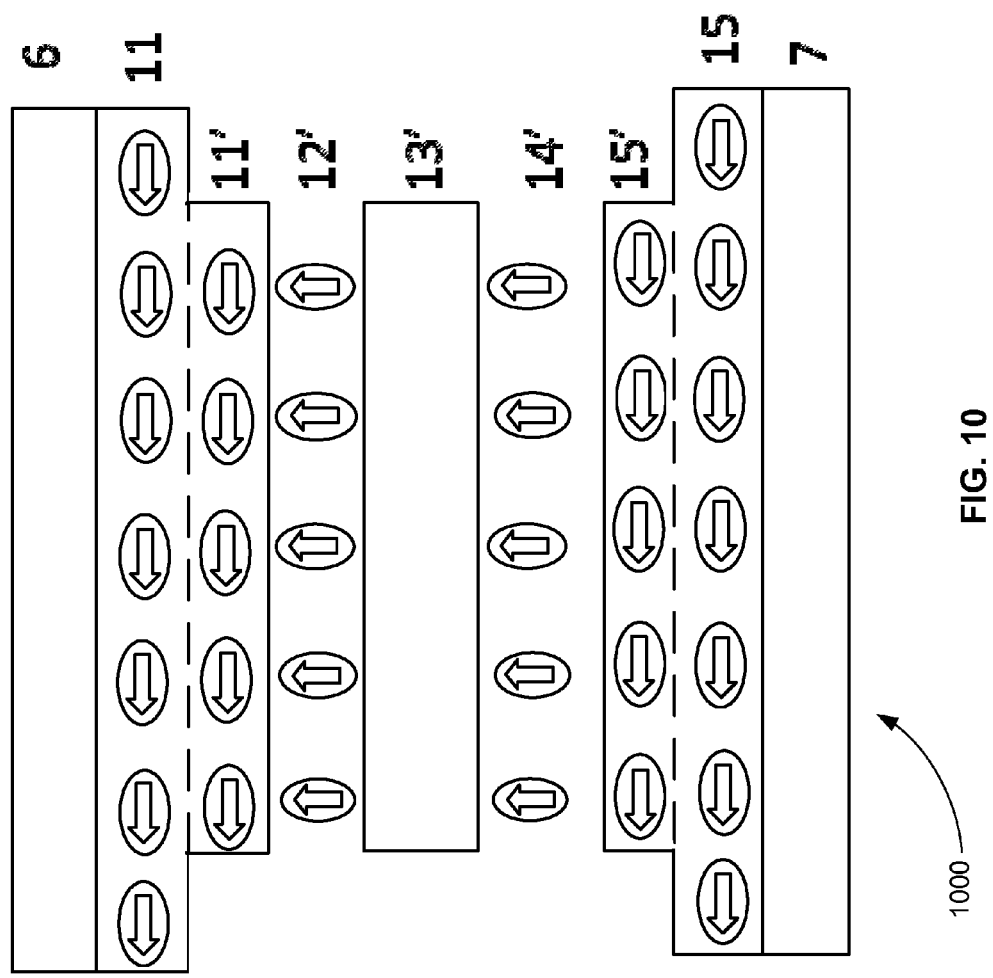
FIG. 10 is a schematic diagram showing a magnetic capacitor that includes a first magnetized layer with an outer layer and an inner layer and a third magnetized layer with an outer layer and an inner layer located between the first electrode layer and the second electrode layer that apply a magnetic field to an insulator layer that is parallel to the first electrode layer and the second electrode layer and that includes a second magnetized layer and a fourth magnetized layer located between the first electrode layer and the second electrode layer that apply a magnetic field to the insulator layer that is perpendicular to the first electrode layer and the second electrode layer, in accordance with various embodiments.

FIG. 10 is a schematic diagram showing a magnetic capacitor 1000, in accordance with various embodiments. Magnetic capacitor 1000 includes a first magnetized layer with outer layer 11 and inner layer 11' and a third magnetized layer with outer layer 15 and inner layer 15' located between first electrode layer 6 and second electrode layer 7. Outer layer 11, inner layer 11', outer layer 15, and inner layer 15' apply a magnetic field to insulator layer 13' that is parallel to first electrode layer 6 and second electrode layer 7.

Magnetic capacitor 1000 also includes a second magnetized layer 12' and a fourth magnetized layer 14' located between first electrode layer 6 and second electrode layer 7. Second magnetized layer 12' and fourth magnetized layer 14' apply a magnetic field to insulator layer 13' that is perpendicular to first electrode layer 6 and second electrode layer 7.

In various embodiments, the first magnetized layer and the third magnetized layer can be located on either side of the insulator layer, but outside of the first electrode layer and the second electrode layer.

Figure 11:
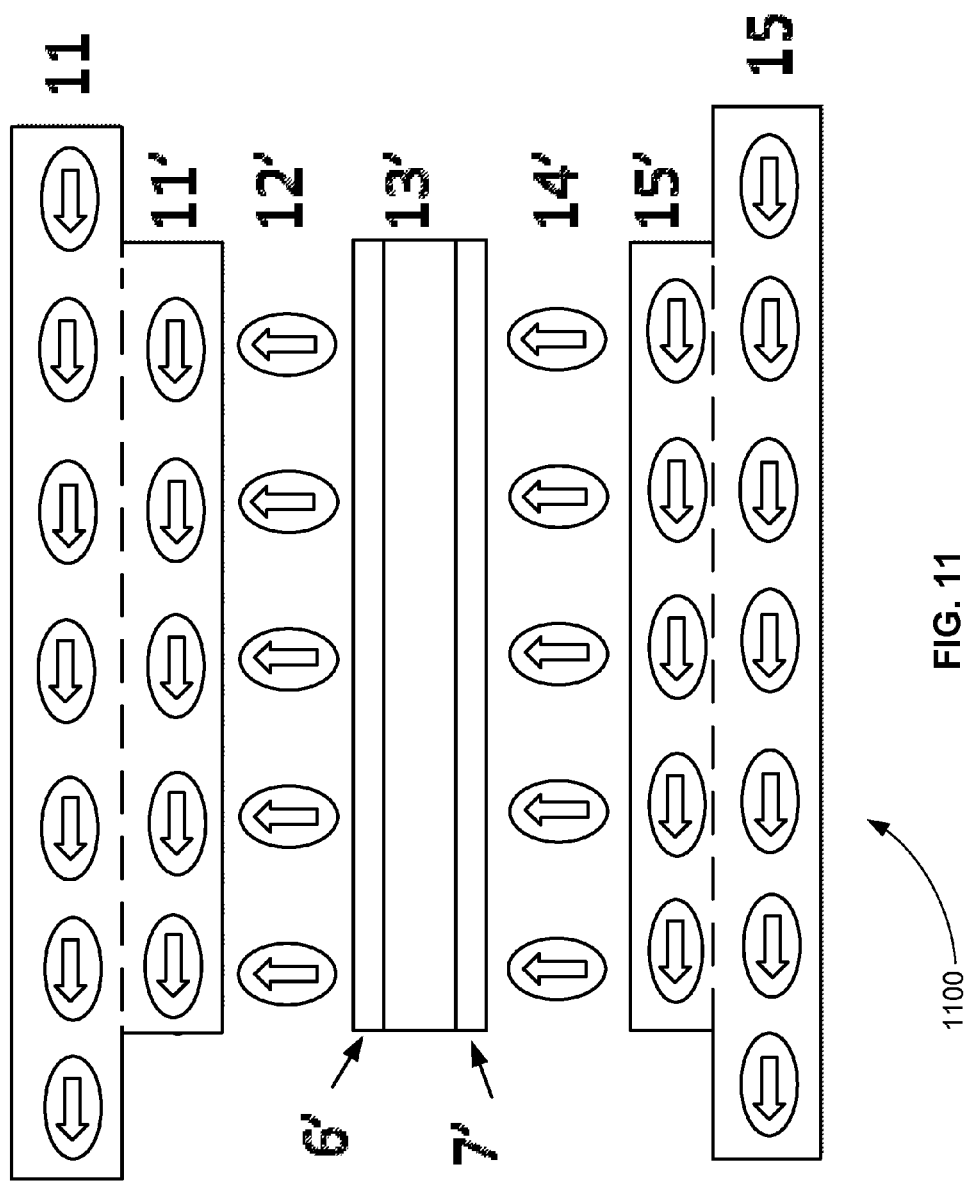
FIG. 11 is a schematic diagram showing a magnetic capacitor that includes a first magnetized layer with an outer layer and an inner layer and a third magnetized layer with an outer layer and an inner layer located outside of the first electrode layer and the second electrode layer that apply a magnetic field to an insulator layer that is parallel to the first electrode layer and the second electrode layer and that includes a second magnetized layer and a fourth magnetized layer located outside of the first electrode layer and the second electrode layer that apply a magnetic field to the insulator layer that is perpendicular to the first electrode layer and the second electrode layer, in accordance with various embodiments.

FIG. 11 is a schematic diagram showing a magnetic capacitor 1100, in accordance with various embodiments. Magnetic capacitor 1100 includes a first magnetized layer with outer layer 11 and inner layer 11' and a third magnetized layer with outer layer 15 and inner layer 15' located outside of first electrode layer 6' and second electrode layer 7'. Outer layer 11, inner layer 11', outer layer 15, and inner layer 15' apply a magnetic field to insulator layer 13' that is parallel to first electrode layer 6' and second electrode layer 7'.

Magnetic capacitor 1100 also includes a second magnetized layer 12' and a fourth magnetized layer 14' located outside of first electrode layer 6' and second electrode layer 7'. Second magnetized layer 12' and fourth magnetized layer 14' apply a magnetic field to insulator layer 13' that is perpendicular to first electrode layer 6' and second electrode layer 7'.

In various embodiments, a magnetic capacitor can include two magnetized layers where each of the magnetized layers apply a magnetic field to the insulator layer that is both substantially parallel and perpendicular to the electrode layers. The ferro-magnetic elements of each of the two magnetized layers are magnetized at angle between the parallel and perpendicular directions with respect to the electrode layers so that both parallel and perpendicular components of a magnetic field are applied to the insulator layer.

In various embodiments, a magnetic capacitor can include a single magnetized layer that applies magnetic field to the insulator layer that is both substantially parallel and perpendicular to the electrode layers.

Figure 12:
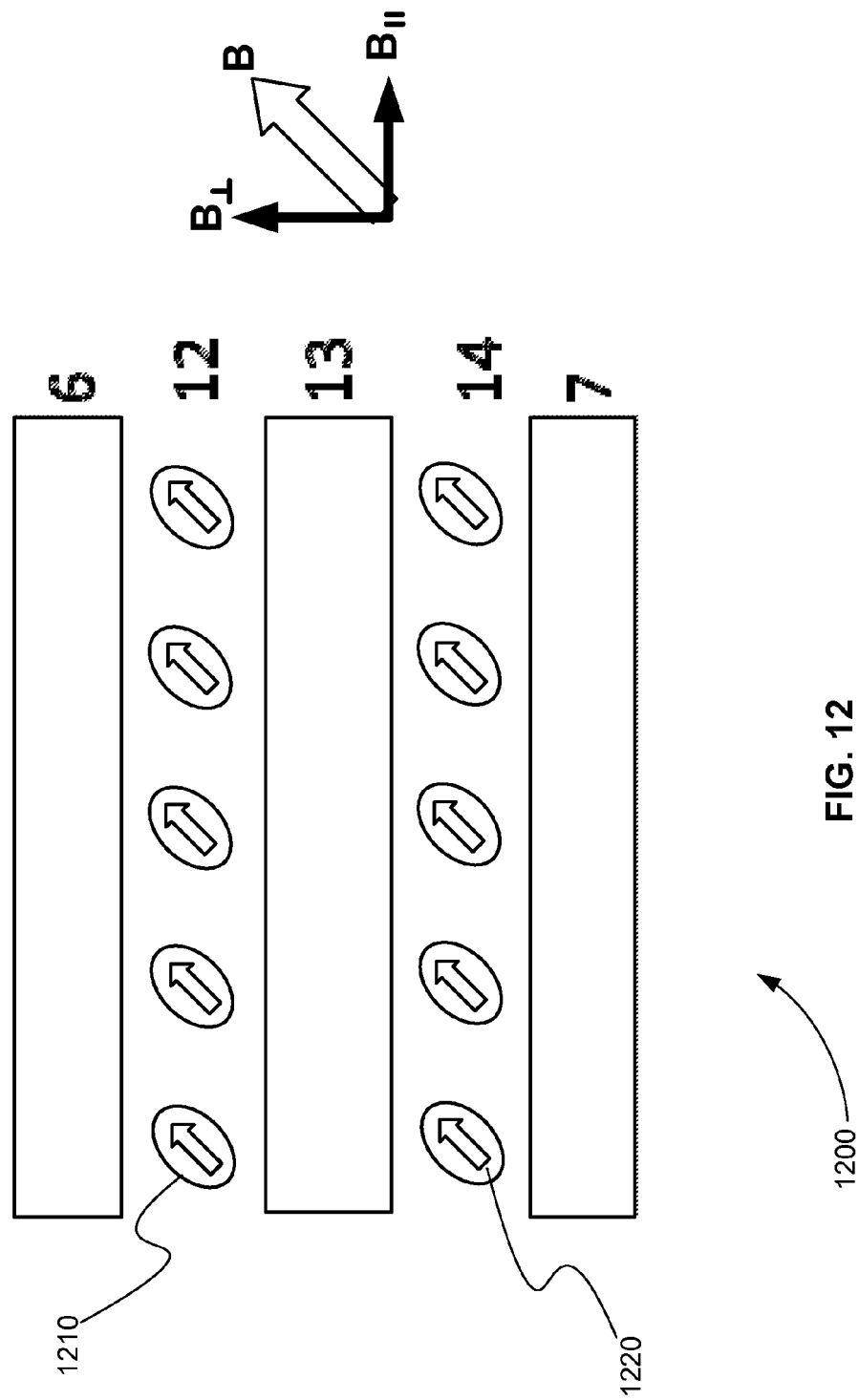
FIG. 12 is a schematic diagram showing a magnetic capacitor that includes a first magnetized layer and a second magnetized layer located on either side of an insulator layer and between a first electrode layer and a second electrode layer, where the first magnetized layer and the second magnetized layer include ferro-magnetic elements that are magnetized at angle relative to the first electrode layer and the second electrode layer so that the magnetic fields applied by the magnetized layers to the insulator layer have components in directions both perpendicular and parallel to the electrode layers, in accordance with various embodiments.

FIG. 12 is a schematic diagram showing a magnetic capacitor 1200, in accordance with various embodiments. Magnetic capacitor 1200 includes a first magnetized layer 12 and a second magnetized layer 14 located between first electrode layer 6 and second electrode layer 7. First magnetized layer 12 and second magnetized layer 14 apply a magnetic field to insulator layer 13 that is both perpendicular and parallel to first electrode layer 6 and second electrode layer 7.

First magnetized layer 12 and second magnetized layer 14 are located on either side of insulator layer 13. First magnetized layer 12 includes first ferro-magnetic elements 1210, and second magnetized layer 14 includes second ferro-magnetic elements 1220. First ferro-magnetic elements 210 and second ferro-magnetic elements 220 are magnetized at an angle relative to first electrode layer 6 and second electrode layer 7. Magnetizing first ferro-magnetic elements 210 and second ferro-magnetic elements 220 at an angle relative to first electrode layer 6 and second electrode layer 7 allows components of the magnetic fields of first magnetized layer 12 and second magnetized layer 14 to be applied to insulator layer 13 in directions both perpendicular and parallel to first electrode layer 6 and second electrode layer 7.

Multi-Layers

Figure 13:
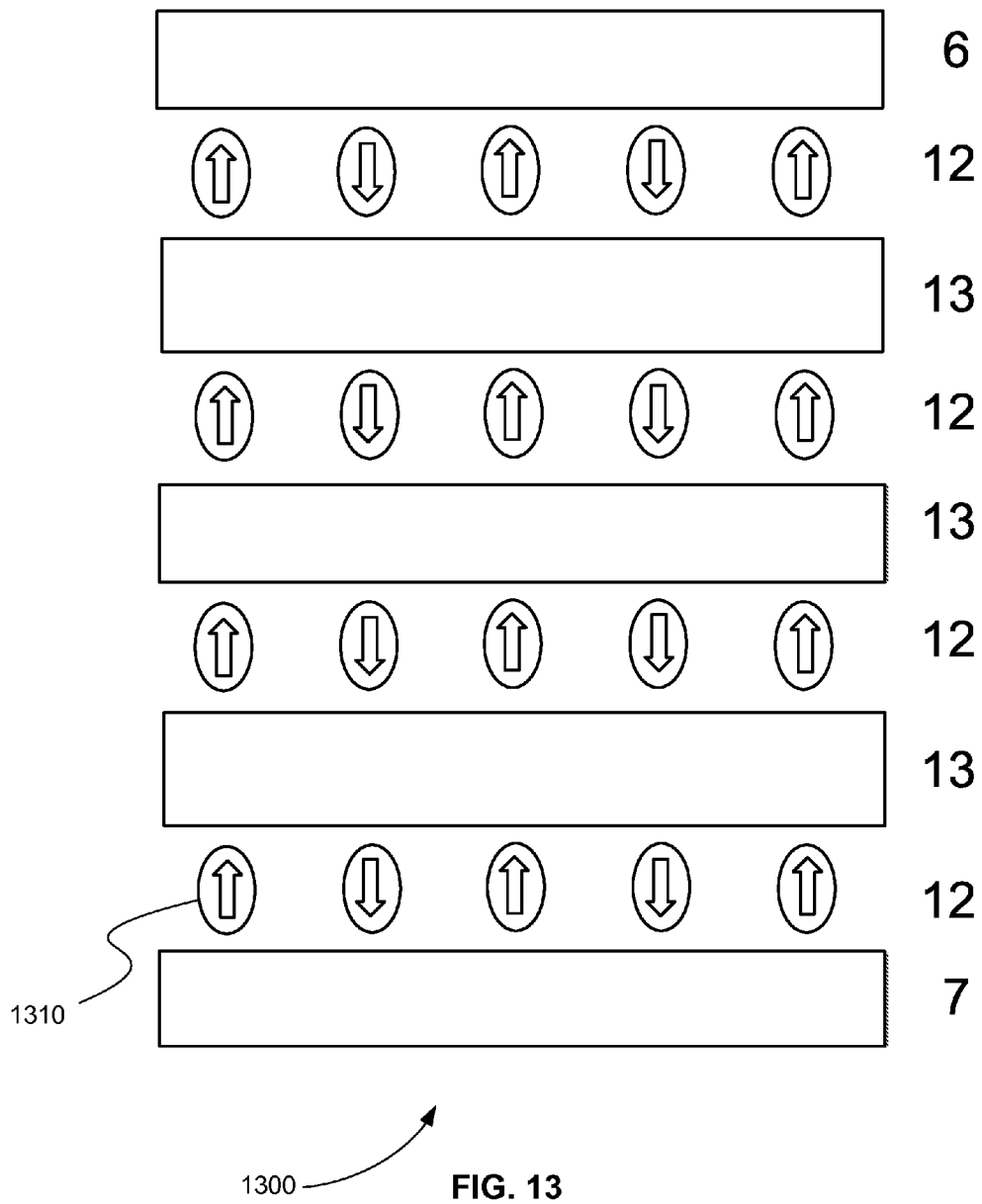
FIG. 13 is a schematic diagram showing a multi-layer magnetic capacitor that includes four magnetized layers surrounding three insulator layers between two electrodes layers, where each magnetized layer of four magnetized layers includes ferro-magnetic elements that are magnetized perpendicular to the electrode layers to produce a periodic magnetic field along the length of insulator layers that is perpendicular to the electrode layers, in accordance with various embodiments.
Figure 14:
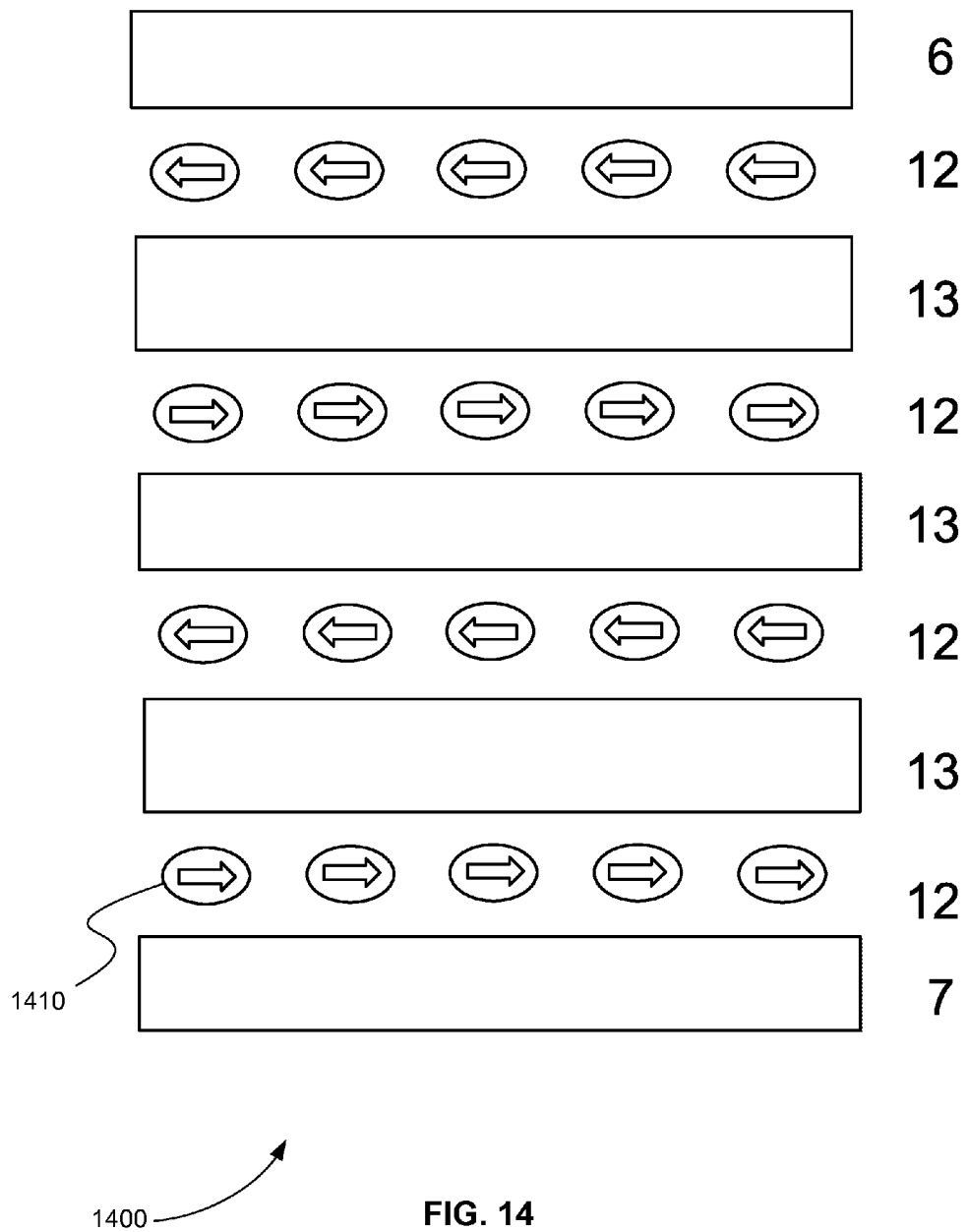
FIG. 14 is a schematic diagram showing a multi-layer magnetic capacitor that includes four magnetized layers surrounding three insulator layers between two electrodes layers, where each magnetized layer of four magnetized layers includes ferro-magnetic elements that are magnetized parallel to the electrode layers to produce a periodic magnetic field along the length of insulator layers that is perpendicular to the electrode layers, in accordance with various embodiments.

In various embodiments, perpendicular, parallel, or both perpendicular and parallel magnetization is applied to two or more insulating layers in a multi-layer magnetic capacitor. As described above, an insulating layer and one or more additional insulating layers can be layered between a first magnetized layer and one or more additional magnetized layers forming a super-lattice, for example. Any of the various embodiments described above can be used to fabricate a multi-layer magnetic capacitor. FIGS. 13-14 are exemplary multi-layer magnetic capacitors.

FIG. 13 is a schematic diagram showing a magnetic capacitor 1300, in accordance with various embodiments. Magnetic capacitor 1300 includes four magnetized layers 12 surrounding three insulator layers 13 that are all located between first electrode layer 6 and second electrode layer 7. Each magnetized layer of magnetized layers 12 includes ferro-magnetic elements 1310. Ferro-magnetic elements 1310 are magnetized perpendicular to first electrode layer 6 and second electrode layer 7. Ferro-magnetic elements 1310 are magnetized to produce a periodic magnetic field along the length of insulator layers 13 that is perpendicular to first electrode layer 6 and second electrode layer 7. Each ferro-magnetic element of ferro-magnetic elements 1310 is alternately magnetized. As a result, adjacent ferro-magnetic elements in each magnetized layer are magnetized in opposite directions. The magnetic fields of magnetic capacitor 1300 increase the capacitance and the electrical storage of the device.

FIG. 14 is a schematic diagram showing a magnetic capacitor 1400, in accordance with various embodiments. Magnetic capacitor 1400 also includes four magnetized layers 12 surrounding three insulator layers 13 that are all located between first electrode layer 6 and second electrode layer 7. Each magnetized layer of magnetized layers 12 includes ferro-magnetic elements 1410. Ferro-magnetic elements 1410, however, are magnetized parallel to first electrode layer 6 and second electrode layer 7. Ferro-magnetic elements 1410 are also magnetized to produce a periodic magnetic field along the length of insulator layers 13 that is perpendicular to first electrode layer 6 and second electrode layer 7. Each ferro-magnetic element of ferro-magnetic elements 1410 within a magnetized layer is magnetized in the same direction, but the magnetic elements 1410 in alternating layers are magnetized in opposite directions. The magnetic fields of magnetic capacitor 1400 also increase the capacitance and the electrical storage of the device.

Applications

In various embodiments, one or more magnetic capacitors are connected to a switch, a fuse, or an inverter to protect the device and to regulate the voltage applied. In various embodiments, one or more magnetic capacitors are connected to or embedded in an electrical apparatus for storing electrical energy or providing electrical energy. For example, one or more magnetic capacitors are part of a battery system.

Fabricating a Magnetic Capacitor

Figure 15:
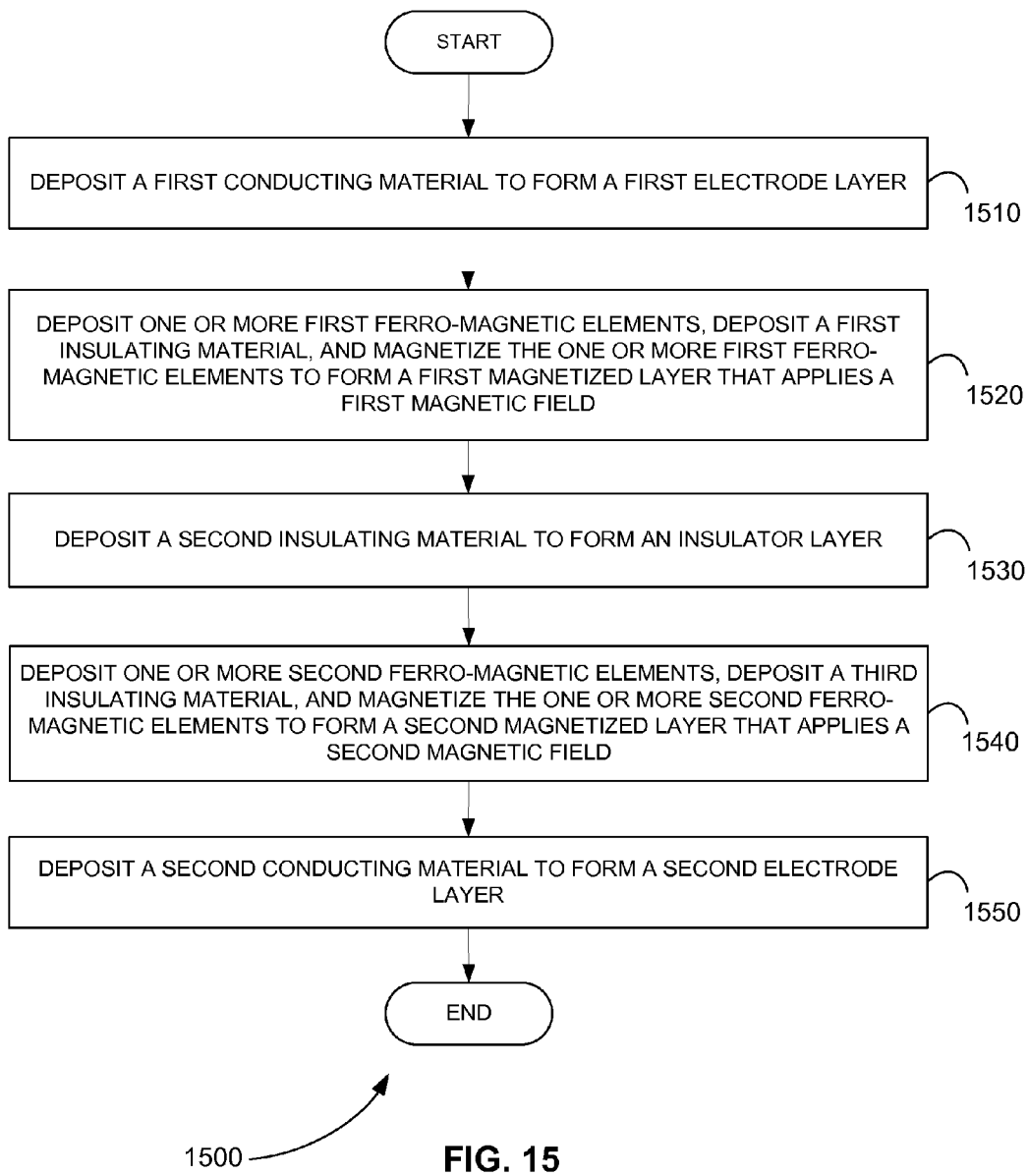
FIG. 15 is an exemplary flowchart showing a method for fabricating a magnetic capacitor, in accordance with various embodiments.

FIG. 15 is an exemplary flowchart showing a method 1500 for fabricating a magnetic capacitor, in accordance with various embodiments.

In step 1510 of method 1500, a first conducting material is deposited to form a first electrode layer.

In step 1520, one or more first ferro-magnetic elements are deposited, a first insulating material is deposited, and the one or more first ferro-magnetic elements are magnetized to form a first magnetized layer that applies a first magnetic field.

In step 1530, a second insulating material is deposited to form an insulator layer.

In step 1540, one or more second ferro-magnetic elements are deposited, a third insulating material is deposited, and the one or more second ferro-magnetic elements are magnetized to form a second magnetized layer that applies a second magnetic field.

In step 1550, a second conducting material is deposited to form a second electrode layer. The first conducting material, the one or more first ferro-magnetic elements, the first insulating material, the second insulating material, the one or more second ferro-magnetic elements, the third insulating material, and the second conducting material are deposited so that the insulator layer is located between the first electrode layer and the second electrode layer and between the first magnetizing layer and the second magnetizing layer. The one or more first ferro-magnetic elements and the one or more second ferro-magnetic elements are magnetized so that the first magnetic field and the second magnetic field are applied to the insulator layer to improve an electrical property of the magnetic capacitor.

Figure 16:
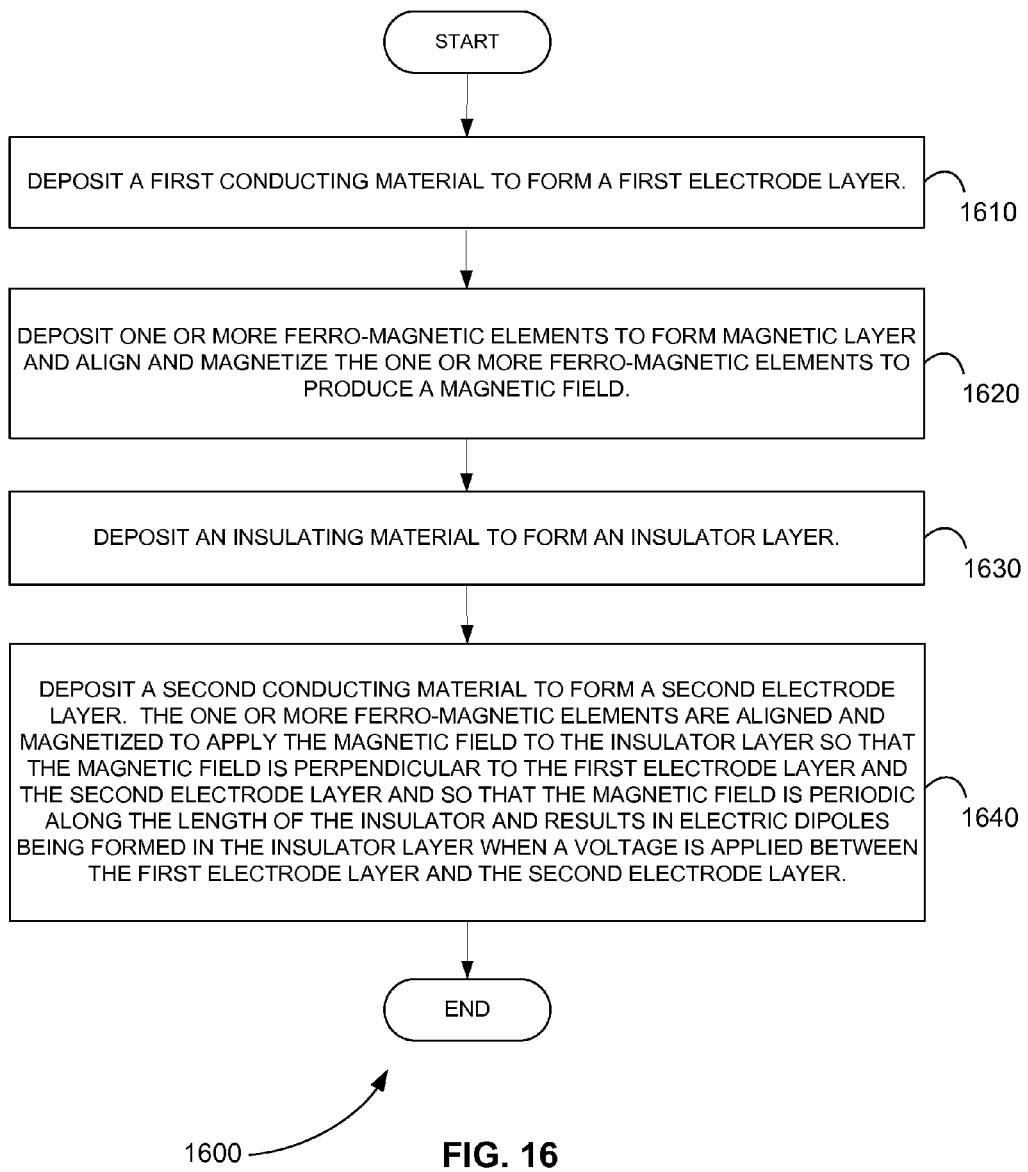
FIG. 16 is an exemplary flowchart showing a method for fabricating a magnetic capacitor with one insulating layer, in accordance with various embodiments.

FIG. 16 is an exemplary flowchart showing a method 1600 for fabricating a magnetic capacitor with one insulating layer, in accordance with various embodiments.

In step 1610 of method 1600, a first conducting material is deposited to form a first electrode layer.

In step 1620, one or more first ferro-magnetic elements are deposited to form magnetic layer and are aligned and magnetized to produce a magnetic field.

In step 1630, an insulating material is deposited to form an insulating layer.

In step 1640, a second conducting material is deposited to form a second electrode layer. The one or more ferro-magnetic elements are aligned and magnetized to apply the magnetic field to the insulator layer so that the magnetic field is perpendicular to the first electrode layer and the second electrode layer, and so that the magnetic field is periodic along the length of the insulator layer and results in electric dipoles being formed in the insulator layer when a voltage is applied between the first electrode layer and the second electrode layer.

In various embodiments, the first conducting material and the second conducting material can include, but are not limited to, Al, a doped semiconductor, W, Si, TiN, or a conducting polymer. The first conducting material and the second conducting material can also include, but are not limited to, graphene, conductive metals, or superconductors. The first conducting material and the second conducting material can be deposited using evaporation, sputtering, chemical vapor deposition (CVD), or spin coating, for example.

In various embodiments, the insulating material can include, but are not limited to, $SiO_2$, $Si_3N_4$, $SiN_x$, $TiO_2$, $BaTiO_3$ or $Al_2O_3$. The insulating material can also include magneto-ferroelectric materials that produce a huge dielectric constant under a magnetic field. These materials include, but are not limited to, LaSr(Mn/Fe/Co/Ni)xO3, Ba/Ti/Sr/La/Bi/Y(Fe/Co/Ni/Mn)xO3, Ho(Fe/Co/Ni/Mn)xO5, or Lu(Fe/Co/Ni/Mn)xO4, where '/' implies 'or' and x=1, 2, or 3. The insulating material can be deposited using evaporation, sputtering, or chemical vapor deposition (CVD), for example. An insulator layer can be annealed at a suitable temperature, for example, from 200 C to 800 C to enhance the insulating quality and the endurance of the films. Then subsequently, ferro-magnetic elements can be deposited to form magnetized layers.

The one or more ferro-magnetic elements can include, but are not limited to, PtNi, PtFe, FeCo, CoFeO4, HfOx, or FeCoNi.

The one or more ferro-magnetic elements are deposited in the form of plates or magnetic nanodots between or outside of the electrodes. The one or more ferro-magnetic elements can be deposited with or without an insulating layer. Magnetic nanodots can be formed spontaneously at a certain temperature. However a ferro-magnetic plate containing many nanodots can be formed in different shapes using a lithographic process, for example. Magnetic nanodots can be formed in a number of different shapes due to the coagulation effect, for example. These shapes can include, but are not limited to, spheres, ellipsoids, rods, or cones. Magnetic nanodots can have lengths on the order of nanometers or micrometers. For example, magnetic nanodots that have a length on the order of 10 nm and are aligned perpendicular to the plane of the electrode layers can produce a periodic magnetic field with a period of about 20 nm.

The one or more ferro-magnetic elements are magnetized using an annealing process, for example. The elements are annealed in vacuum or in inert gas, such as Ar, or $N_2$ for example, or are annealed simultaneously with the deposition of an insulating material. The annealing process can be performed at an elevated temperature of 300° C. to 1000° C., for example. The ferro-magnetic plates or magnetic nanodots are annealed to a specific direction spontaneously or in a strong magnetic field, for example.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A method for fabricating a magnetic capacitor, comprising:
    depositing a first conducting material to form a first electrode layer;
    depositing one or more ferro-magnetic elements to form a ferro-magnetic layer;
    aligning and magnetizing the one or more ferro-magnetic elements of the ferro-magnetic layer to produce a net magnetic field and transform the ferro-magnetic layer into a magnetized layer;
    depositing an insulating material to form an insulator layer; and
    depositing a second conducting material to form a second electrode layer, wherein the first conducting material, the one or more ferro-magnetic elements, the insulating material, and the second conducting material are deposited so that the insulator layer is located between the first electrode layer and the second electrode layer, and wherein the one or more ferro-magnetic elements of the ferro-magnetic layer are aligned and magnetized to apply the net magnetic field to the insulator layer so that the net magnetic field is perpendicular to the first electrode layer and the second electrode layer, and so that the net magnetic field is periodic along the length of the insulator layer and results in electric dipoles being formed in the insulator layer when a voltage is applied between the first electrode layer and the second electrode layer.

2. The method of claim 1, wherein the one or more ferro-magnetic elements comprise one or more ferro-magnetic plates.

3. The method of claim 1, wherein the one or more ferro-magnetic elements comprise one or more magnetic nanodots.

4. The method of claim 1, wherein aligning and magnetizing the one or more ferro-magnetic elements of the ferro-magnetic layer to produce a net magnetic field comprises annealing the one or more ferro-magnetic elements.

5. The method of claim 1, wherein the one or more ferro-magnetic elements of the ferro-magnetic layer are aligned and magnetized to apply the net magnetic field to the insulator layer according to the following formula $$\vec{B} = B_1\left(1 + \cos\left(\frac{2\pi}{\lambda}x\right)\right)\hat{z}.$$

6. The method of claim 1, wherein each element of the one or more ferro-magnetic elements is magnetized in the opposite direction.

7. The method of claim 1, wherein the one or more ferro-magnetic elements are organized into groups and each group is magnetized in the opposite direction.

8. The method of claim 1, wherein the one or more ferro-magnetic elements comprise PtNi, PtFe, FeCo, CoFeO4, HfOx, or FeCoNi.

9. The method of claim 1, wherein the insulating material comprises Ba/Ti/Sr/La/BUY(Fe/Co/Ni/Mn)xO3, where '/' means 'or' and x=1, 2, or 3.

10. The method of claim 1, wherein the insulating material comprises Ho(Fe/Co/Ni/Mn)xO5, where '/' means 'or' and x=1, 2, or 3.

11. The method of claim 1, wherein the insulating material comprises Lu(Fe/Co/Ni/Mn)xO4, where '/' means 'or' and x=1, 2, or 3.

12. The method of claim 1, wherein the insulating material comprises LaSr(Mn/Fe/Co/Ni)xO3 where '/' means 'or' and x=1, 2, 3.

13. The method of claim 1, wherein the first conducting material and the second conducting material comprise Al or W.

14. The method of claim 1, wherein the first conducting material and the second conducting material comprise a doped semiconductor.

15. The method of claim 1, wherein the first conducting material and the second conducting material comprise Si.

16. The method of claim 1, wherein the first conducting material and the second conducting material comprise TiN.

17. The method of claim 1, wherein the first conducting material and the second conducting material comprise a conducting polymer.

18. The method of claim 1, wherein the first conducting material and the second conducting material comprise graphene.

19. The method of claim 1, wherein the first conducting material and the second conducting material comprise a conductive metal.

20. The method of claim 1, wherein the first conducting material and the second conducting material comprise a superconductor.

* * * * *